UNITED STATES PATENT OFFICE.

JOHN W. HORNSEY, OF SUMMIT, NEW JERSEY, ASSIGNOR TO MINERAL PRODUCTS CORPORATION, OF NEW YORK, N. Y., A CORPORATION OF MAINE.

PURIFICATION OF ALUMINA.

1,255,749.  Specification of Letters Patent.  Patented Feb. 5, 1918.

No Drawing.  Application filed August 11, 1917. Serial No. 185,710.

*To all whom it may concern:*

Be it known that I, JOHN W. HORNSEY, a citizen of the United States, residing at Summit, in the county of Union, State of New Jersey, have invented certain new and useful Improvements in Purification of Alumina; and I do hereby declare the following to be a full, clear, and exact description of the invention, such as will enable others skilled in the art to which it appertains to make and use the same.

This invention relates to the purification or refining of impure alumina, and is based upon the discovery that when the impure alumina, resulting from calcination of alunite and the leaching of the soluble constituents from the calcine, is mixed in a finely divided condition, with water to form a pulp, and subjected to a flotation operation, the alumina can be floated and recovered from the froth in a purified condition, while the accompanying impurities remain behind in the tailings.

When alunite is mined, the mined mineral is commonly associated with considerable amounts of gangue or impurities, such as native rock or rhyolite, which it is difficult to separate during the mining operation. When such impure alunite is calcined, and the calcine leached, for the recovery of potash therefrom, the alumina remains in an impure state associated with the impurities present. These impurities consist largely of silica and silicious gangue and are difficult to remove and preclude ultilization of the impure alumina for purposes where a pure alumina is required.

I have found that this impure alumina, resulting from the calcination and leaching of alunite, can be purified and concentrated by mixing it with water to form a pulp and subjecting the pulp to a flotation operation.

It is well known that sulfid ores can be separated from their associated gangue by flotation processes; but it is likewise well known that oxid ores do not lend themselves to flotation concentration, as do sulfids, so that it has been considered necessary to convert the oxid ores into sulfids in order to make them amenable to concentration by flotation.

Although the alumina of calcined and leached alunite is an oxid, I have nevertheless discovered that it is possible to effect its concentration by flotation; and that the alumina is of a nature adapting it for effective purification from its accompanying impurities or gangue, by flotation processes.

The impure alumina, resulting from the calcination and leaching of alunite, is in such a finely divided state that it will not usually require any separate grinding operation to make it available for treatment by flotation; but it will be understood that the material may be subjected to a preliminary grinding, in a ball mill or any other appropriate grinding apparatus, where the material contains particles which it may be desired to reduce in size preliminary to the flotation.

In carrying out the flotation of the alumina, the impure alumina, in a finely divided condition, may be mixed with varying proportions of water, to give various degrees of dilution, but I have found a mixture of about one part of the alumina to eight parts of water to give good results. With this mixture there may be with advantage combined, before or during the flotation operation, a suitable proportion of an oil or other agent promoting the flotation, for example, two lbs. of oleic acid per ton of the impure alumina. The resulting mixture can then be introduced into a suitable type of flotation cell, such as a Callow pneumatic cell, after preliminary intimate intermixture of the oleic acid or a Hoover or Janney cell, and subjected to aeration with resulting froth formation therein, and the froth collected and removed from the cell and subsequently dried or otherwise treated in accordance with the contemplated use of the product.

The impure alumina is purified or concentrated during the flotation operation and separated, in a purified state, in the form of a froth, while the impurities largely remain behind and are recovered in the tailings. It will be understood that the alumina may be subjected to a series of treatments by passing the partially concentrated or purified alumina through another "cleaner" cell or a series of such cells, whereby the alumina is progressively increased in purity until the desired degree of purity is obtained. It will be understood also that the tailings can be similarly re-treated and further amounts of alumina, of a greater or less degree of purity, recovered therefrom.

It will be evident that different types of apparatus are available for practising the process of the present invention, including flotation cells of the pneumatic type, such as the Callow cell, and apparatus where the air is incorporated with the mixture by mechanical agitation.

So also, various oils are available for the carrying out of the flotation operation of the present invention. The particular oil or mixture of oils utilized will depend upon such considerations as market conditions and efficacy during the flotation. The amount of oil may also be varied with different oils or oil mixtures, and the oil, or other frothing agent, may be added in successive steps, and the froth produced from the different steps collected separately or together. Instead of oils, other appropriate frothing agents or mixtures of such agents, may be used which enable a proper froth to be produced; or mixtures of one or more of these agents with one or more oils may be employed; or the oil or frothing agent may, in some cases, be entirely omitted and the flotation operation carried out with air alone or with other gases having a selective action in floating the alumina from its associated gangue.

The separation or collection of the froth, and the subsequent treatment of the purified alumina contained therein, will vary in accordance with different types of apparatus and the subsequent treatment to which the alumina is to be subjected, as will be readily understood.

The impure alumina can, by the process of the present invention, be so increased in purity that it becomes available for use where alumina of high purity is required, for example, in the manufacture of metallic aluminum, or for the manufacture of abrasives and refractories, etc.

The process of the present invention is distinguished from the common flotation processes of concentrating sulfid ores in that the greater part of the impure alumina is recovered in a purified form in the froth and the concentrate, while the silicous impurities and gangue form but a small portion of the material treated; whereas, the common methods of concentrating sulfid ores involve the recovery of a small percentage of the sulfids, often in a still highly impure condition, from the main body of gangue. The present process is accordingly one which involves the recovery of the greater part of the material treated in the form of the purified alumina or concentrate, while but a small amount of the impurities or tailings will usually be obtained. A relatively small amount of the water or flotation liquor will accordingly be discharged with the tailings. This liquor may, however, be recovered and used over again, as well as the liquor recovered from the purified alumina, and the oil or other frothing agent contained therein thereby returned to the process, with corresponding reduction and economy in the amount of such agents required to be added during the subsequent carrying out of the process.

Inasmuch as the impure alumina such as results from the calcination and leaching of alunite is difficult to purify and to separate from its accompanying impurities to an extent sufficient to enable the alumina to be used in a highly purified state, it will be apparent that the present invention is one of particular advantage as well as one of notable economy in the refining and purification of the impure alumina.

It will be understood that the present invention is limited to the purification of alumina resulting from the calcination and leaching of alunite, and is not applicable to the separation of alumina obtained from other sources, as, for instance, the alumina obtained by prevailing methods from bauxite and the like.

I claim:

1. The method of refining or purifying impure alumina resulting from the calcining of alunite and the leaching of the calcine, which comprises mixing the impure alumina, in a finely divided condition, with water to form a pulp, and subjecting the resulting pulp to a flotation operation and thereby separating the alumina in the form of a froth from the impurities, and recovering the alumina from the froth; substantially as described.

2. The method of refining or purifying the impure alumina resulting from the calcining of alunite and the leaching of the calcine, which comprises mixing the impure alumina, in a finely divided condition, with water to form a pulp, and subjecting the resulting pulp to a flotation operation with the addition of an agent promoting the flotation of the alumina, and thereby separating the alumina in the form of a froth from the impurities, and recovering the alumina from the froth; substantially as described.

3. The method of refining or purifying the impure alumina resulting from the calcining of alunite and the leaching of the calcine, which comprises mixing the impure alumina, in a finely divided condition, with water to form a pulp, and subjecting the resulting pulp to a flotation operation with the addition of oil, and thereby separating the alumina in the form of a froth from the impurities, and recovering the alumina from the froth; substantially as described.

In testimony whereof I affix my signature.

JOHN W. HORNSEY.